REMOTE CONTROL OPERATING DEVICE FOR TAPE RECORDER

Filed Oct. 28, 1957

Aaron E. Smith
INVENTOR.

BY Clarence A. O'Brien and Harvey B. Jacobson
Attorneys

United States Patent Office 2,916,574
Patented Dec. 8, 1959

2,916,574

REMOTE CONTROL OPERATING DEVICE FOR TAPE RECORDER

Aaron E. Smith, Salt Lake City, Utah

Application October 28, 1957, Serial No. 692,782

3 Claims. (Cl. 200—61.13)

This invention relates to a remote control operating device for use in combination with a tape recorder for synchronizing the tape recorder with an external device such as a slide projector, lamp, or other mechanism.

The primary object of the present invention resides in the provision of an accessory for most models of conventional recorders which will enable the tape recorder to be used in combination with a slide projector or other like external device whereby the external device will be either automatically actuated or there will be provided a synchronized signal for an operation of the external device. Utilized in conjunction with the invention is magnetic recording tape preferably constructed of an insulative plastic material or the like which is provided with a coating in the form of conducting paint or metallic strip which is affixed to the tape at convenient intervals. It is to be understood that the invention may be made separately and adapted to be provided as an accessory to the tape recorder or may be incorporated in the tape recorder as one of the components thereof during the construction of the tape recorder.

A further object of this invention is to provide means for actuating a remote electrical device adapted to be energized through a moving segmented conductive tape. The means include at least one resiliently mounted electrically conductive brush which is adapted to complete an electrical circuit by contacting a conductive portion of said tape. Subject to design considerations, one or two brushes may be utilized. When two brushes are utilized, the conductive segment electrically bridges the brushes to complete an electrical circuit. When only one brush is utilized, an electrical ground system is employed in which one wire is grounded to a tape recorder chassis.

Still further objects and features of this invention reside in the provision of a remote control operating device for use in combination with a tape recorder that is simple in construction, efficient in operation, and which is relatively inexpensive to manufacture thereby permitting wide use and distribution.

These, together with the various ancillary objects and features of the invention which will become apparent as the following description proceeds, are attained by this device, preferred embodiments of which have been illustrated in the accompanying drawings, by way of example only, wherein.

Figure 1:
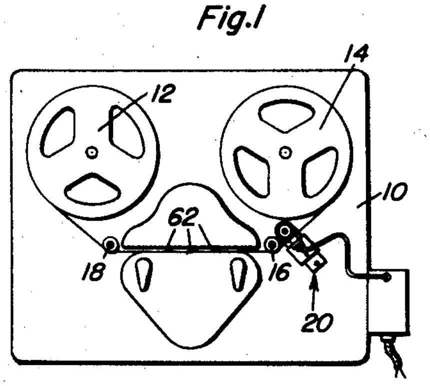
Figure 1 is a plan view of a recorder having the remote control operating device comprising the present invention mounted thereon.

With continuing reference to the accompanying drawings wherein like reference numerals designate similar parts throughout the various views, reference numeral 10 generally designates a conventional tape recorder having reels 12 and 14 and being provided with a drive capstan as at 16 and an idler roller as at 18. Of course, the drive capstan 16 can be on either side and adjacent either of the reels 12 or 14 as is conventional, dependent upon the make and model of tape recorder, it being immaterial as to the location of the drive capstan 16 and the idler roller 18.

Figure 2:
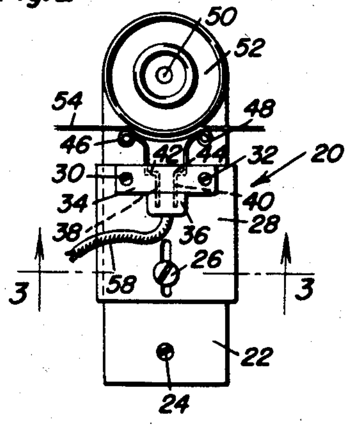
Figure 2 is an enlarged detail plan view of the invention.
Figure 3:
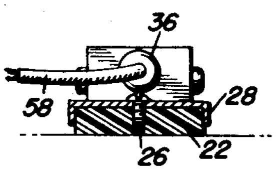
Figure 3 is a vertical sectional detail view as taken along the plane of line 3—3 of Figure 2.
Figure 7:
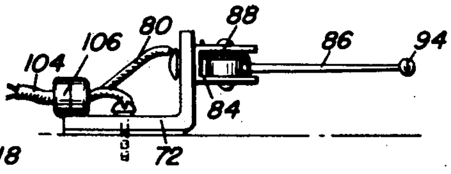
Figure 7 is a side elevational view of the modified form of the invention.
Figure 8:
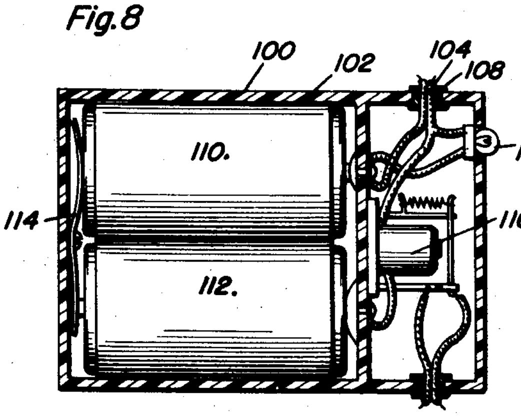
Figure 8 is a sectional detail view illustrating one form of external device which may be utilized in conjunction with the invention.

In one form of the invention a remote control operating device as indicated at 20 is employed. This remote control operating device, the construction of which can be best seen in Figures 2 and 3 includes a base plate 22 adapted to be attached to the tape recorder 10 by means of a screw 24 or other suitable fasteners.

The base plate 22 is preferably formed of an insulative plastic material or the like and threadedly engaged therein is an adjusting screw 26 which mounts a channel shaped mounting plate 28 on the base plate 22 in an adjustable manner.

Secured as by fasteners or screws 30 and 32 to the mounting plate 28 is a brush holder 34 which includes sockets for reception of a plug 36, the prongs 38 and 40 of which are adapted to extend into the brush holder for engaging the contacts 42 and 44 forming part of resilient brushes 46 and 48 threaded in and carried by the brush holder 34. Mounted on the base plate 22 is a shaft 50 holding in place a suitable roller 52 which engages the magnetic tape 54 entrained about the reels 12 and 14 and the sprockets 16 and 18 and which urges the tape against the brushes 46 and 48. The roller 52 may be provided with suitable upper and lower flanges as may be desired for holding the tape 54 in position and is preferably formed of a non-conductive material. The tape 54 is provided along the length thereof with special markings 56 of an electrically conductive paint which when engaged by the brushes 46 and 48 will complete an operative electrical circuit therebetween provided the prongs 38 and 40 are connected through conductor 58 to a suitable source of electrical power. It is to be noted that in lieu of the conductive paint 56, such as silver paint or the like, a strip of electrically conductive metal may be bonded or otherwise attached to the tape 54. Further, it is noted that the tape 54 is preferably constructed from an insulative plastic material and that the conductive paint 56 is applied on the reverse side from that on which the magnetic recording is placed.

The paint 56 may be provided on any suitable portion of the tape for operation of an external device successively, or intermittently with the passage of a certain amount of tape past the reproducing heads as at 62 of the recorder 10.

Figure 5:
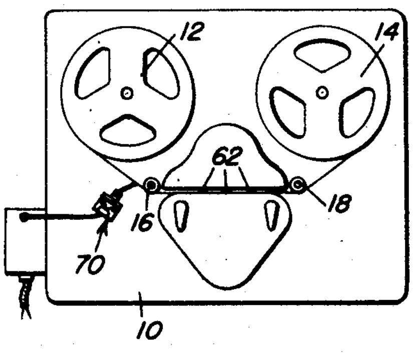
Figure 5 is a plan view of a modified arrangement of the invention.
Figure 4:
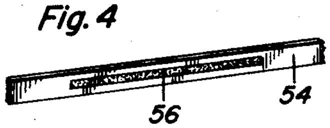
Figure 4 is a perspective view of a portion of magnetic recording tape provided with a coating of metallic conductive paint thereon utilized in conjunction with the invention.
Figure 6:
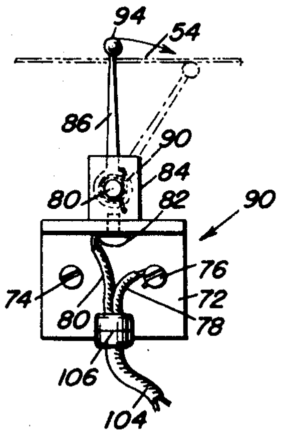
Figure 6 is an enlarged detail plan view of the modified remote control operating device.

In the form of the invention as is shown in Figure 5, a modified device 70 is employed. This device 70 includes a mounting plate 72 attached by means of screws 74 and 76 to the chassis of the recorder 10 with the screw 76 serving as a terminal for connection of conductor 78 to ground which is the chassis. The conductor 80 is connected to a terminal button 82 which is connected to an electrically insulative brush holder 84 to which brush 86 is pivotally attached as at 88 and which is normally urged by spring 90 into engagement with the tape 54 it being noted that the brush 86 is shown in its extended position in solid lines while in phantom lines it is shown resiliently engaging the tape 54. The brush 86 may be made of a suitable resilient material and is further resiliently urged against the tape. Alternatively, the brush 86 may be constructed of a rigid material having a conical engaging surface 94. When utilized in conjunction with a tape recorder, the source of electrical current for powering the remote device is also grounded to the recorder 10.

The device is adapted to be utilized to control any suitable sort of external device by completing an operative electrical circuit from a source of power to the external device. It is within the concept of the invention to employ a device as indicated at 100 which consists of an insulative casing 102 through which conductors 104 connected by means of a plug and socket connection as at 106 to the operating device 70 or by other suitable connectors to the operating device 20 extend. A grommet 108 is of course provided through which the conductors 104 extend. Mounted within the casing 100 are batteries 110 and 112 which are connected in series through contacts 114 with the conductors 104 and which serve to operate a solenoid 116 or an indicator lamp 118. Hence, each time the brushes engage the conductive strip the lamp 118 will be lit and/or the solenoid type relay 116 actuated. The solenoid relay 116 may be used to control a slide projector or other suitable external device or the device may be readily attached to a remote control for the slide projector in any suitable manner.

In use, the tape 54 is first run through and synchronized with the slides as may be desired with markings made by suitable pencil adapted to be utilized in conjunction with the marking of raised surfaces being employed. Then, the tape may be given a coating with a suitable conventional silver paint or other metallic and conductive paint as may be desired or any suitable length depending upon the speed of operation of the tape.

What is claimed as new is as follows:

1. Switch means for actuating a remote electrical device adapted to be energized through a moving segmented conductive tape comprising an insulative brush holder, a pair of spaced electrically conductive resilient brushes carried by said brush holder, conductive receptacles connected to said brushes adapted to receive a plug, an imperforate insulative roller adjacent said brushes for tangentially contacting said tape to urge said tape into contact with said brushes whereby a conductive segment of said tape may electrically bridge said brushes to complete an operative electrical circuit.

2. Switch means for actuating a remote electrical device adapted to be energized through a moving segmented conductive tape comprising a base plate, a channel shaped mounting plate slidably superposed on said base plate, an insulative brush holder carried by said mounting plate, a pair of spaced electrically conductive resilient brushes carried by said brush holder, a socket in said mounting plate, conductive receptacles in said socket connected to said brushes adapted to receive a plug, and a roller adjacent said brushes for tangentially contacting said tape to urge said tape into contact with said brushes whereby a conductive segment of said tape may electrically bridge said brushes to complete an operative electrical circuit.

3. Switch means for actuating a remote electrical device adapted to be energized through a moving segmented conductive tape comprising a base plate, a channel shaped mounting plate slidably superposed on said base plate, an insulative brush holder carried by said mounting plate, a pair of spaced electrically conductive resilient brushes carried by said brush holder, a socket in said mounting plate, conductive receptacles in said socket connected to said brushes adapted to receive a plug, and a roller adjacent said brushes for tangentially contacting said tape to urge said tape into contact with said brushes whereby a conductive segment of said tape may electrically bridge said brushes to complete an operative electrical circuit, a slot in said mounting plate, a threaded aperture in said base plate, said slot and said aperture being aligned, a screw passing through said slot and threadedly engaged in said aperture whereby said mounting plate may be adjustably positioned and fixed with respect to said base plate, said roller carried by said base plate.

References Cited in the file of this patent

UNITED STATES PATENTS

| | | |
|---|---|---|
| 2,430,538 | Somers | Nov. 11, 1947 |
| 2,468,198 | Heller | Apr. 26, 1949 |
| 2,519,245 | Greenleaf et al. | Aug. 15, 1950 |
| 2,631,855 | Kornei | Mar. 17, 1953 |
| 2,693,127 | Ortman | Nov. 2, 1954 |
| 2,839,622 | Billings | June 17, 1958 |